US007075535B2

(12) United States Patent
Aguera y Arcas

(10) Patent No.: US 7,075,535 B2
(45) Date of Patent: Jul. 11, 2006

(54) SYSTEM AND METHOD FOR EXACT RENDERING IN A ZOOMING USER INTERFACE

(75) Inventor: Blaise Aguera y Arcas, Seattle, WA (US)

(73) Assignee: Sand Codex, Seattle, WA (US)

( * ) Notice: Subject to any disclaimer, the term of this patent is extended or adjusted under 35 U.S.C. 154(b) by 0 days.

(21) Appl. No.: 10/790,253

(22) Filed: Mar. 1, 2004

(65) Prior Publication Data
US 2004/0233219 A1 Nov. 25, 2004

Related U.S. Application Data

(60) Provisional application No. 60/475,897, filed on Jun. 5, 2003, provisional application No. 60/474,313, filed on May 30, 2003, provisional application No. 60/453,897, filed on Mar. 12, 2003, provisional application No. 60/452,075, filed on Mar. 5, 2003.

(51) Int. Cl.
*G06T 17/00* (2006.01)
(52) U.S. Cl. .................................... 345/428
(58) Field of Classification Search ........... 345/428
See application file for complete search history.

(56) References Cited

U.S. PATENT DOCUMENTS 5,471,572 A * 11/1995 Buchner et al. ............ 345/671
6,002,406 A * 12/1999 Zhao ............................ 345/581
6,184,894 B1 * 2/2001 Rosman et al. ............. 345/582
6,204,857 B1 * 3/2001 Piazza et al. ................ 345/582
6,348,921 B1 * 2/2002 Zhao et al. ................. 345/428
6,373,495 B1 * 4/2002 Lin et al. .................... 345/582
6,453,330 B1 * 9/2002 Battle et al. ................ 708/290
6,501,482 B1 * 12/2002 Rosman et al. ............. 345/587
6,639,598 B1 * 10/2003 Piazza et al. ................ 345/428
2004/0128070 A1* 7/2004 Schmidt et al. ............. 701/211

OTHER PUBLICATIONS

Bill Overall. Foveated Imaging: Applications to Image and Video Compression. Mar. 12, 1999. http://ise.stanford.edu/class/psych221/projects/99/wro/.*
Space Variant Imaging. Nov. 25, 2002. http://web.archive.org/web/20021125075827/http://www.svi.cps.utexas.edu/index.htm.*
Foley et al. Computer Graphics: Principles and Practice. Addison-Wesley Publishing Company Inc. 1997. p. 166-170.*

* cited by examiner

*Primary Examiner*—Ulka Chauhan
*Assistant Examiner*—Peter-Anthony Pappas
(74) *Attorney, Agent, or Firm*—Kaplan Gilman Gibson & Dernier LLP

(57) ABSTRACT

A method and apparatus is disclosed that facilitates realistic navigation of visual content by displaying an interpolated image during navigation and a more exact image when the navigation ceases. Methodologies are disclosed for rendering and displaying "tiles", portions of the visual content at different levels of detail to minimize perceivable discontinuities.

13 Claims, 8 Drawing Sheets

FIG. 8
FIG. 8A
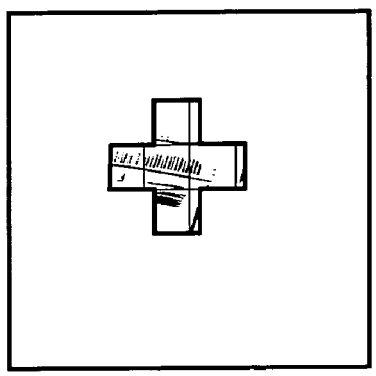
FIG. 8B
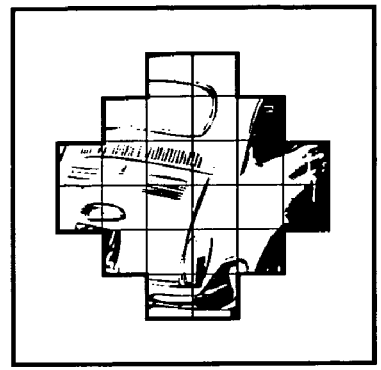
FIG. 8D
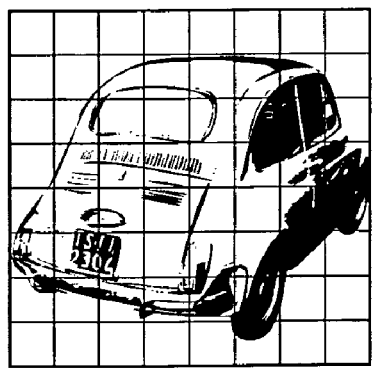
FIG. 8C
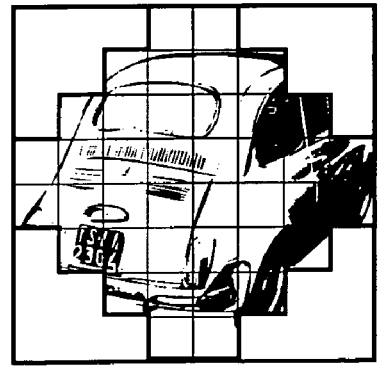

SYSTEM AND METHOD FOR EXACT RENDERING IN A ZOOMING USER INTERFACE

RELATED APPLICATIONS

This application claims priority to U.S. Provisional No. 60/452,075, filed on Mar. 5, 2003, U.S. Provisional No. 60/453,897, filed on Mar. 12, 2003, U.S. Provisional No. 60/475,897, filed on Jun. 5, 2003, and U.S. Provisional No. 60/474,313, filed on May 30, 2003.

FIELD OF THE INVENTION

The present invention relates generally to graphical zooming user interfaces (ZUI) for computers. More specifically, the invention is a system and method for progressively rendering zoomable visual content in a manner that is both computationally efficient, resulting in good user responsiveness and interactive frame rates, and exact, in the sense that vector drawings, text, and other non-photographic content is ultimately drawn without the resampling which would normally lead to degradation in image quality, and without interpolation of other images, which would also lead to degradation.

BACKGROUND OF THE INVENTION

Most present-day graphical computer user interfaces (GUIs) are designed using visual components of a fixed spatial scale. However, it was recognized from the birth of the field of computer graphics that visual components could be represented and manipulated in such a way that they do not have a fixed spatial scale on the display, but can be zoomed in or out. The desirability of zoomable components is obvious in many application domains; to name only a few: viewing maps, browsing through large heterogeneous text layouts such as newspapers, viewing albums of digital photographs, and working with visualizations of large data sets. Even when viewing ordinary documents, such as spreadsheets and reports, it is often useful to be able to glance at a document overview, and then zoom in on an area of interest. Many modern computer applications include zoomable components, such as Microsoft® Word® and other Office® products (Zoom under the View menu), Adobe® Photoshop®, Adobe® Acrobat®, QuarkXPress®, etc. In most cases, these applications allow zooming in and out of documents, but not necessarily zooming in and out of the visual components of the applications themselves. Further, zooming is normally a peripheral aspect of the user's interaction with the software, and the zoom setting is only modified occasionally. Although continuous panning over a document is standard (i.e., using scrollbars or the cursor to translate the viewed document left, right, up or down), the ability to zoom and pan continuously in a user-friendly manner is absent from prior art systems.

First, we set forth several definitions. A display is the device or devices used to output rendered imagery to the user. A frame buffer is used to dynamically represent the contents of at least a portion of the display. Display refresh rate is the rate at which the physical display, or portion thereof, is refreshed using the contents of the frame buffer. A frame buffer's frame rate is the rate at which the frame buffer is updated.

For example, in a typical personal computer, the display refresh rate is 60–90 Hz. Most digital video, for example, has a frame rate of 24–30 Hz. Thus, each frame of digital video will actually be displayed at least twice as the display is refreshed. Plural frame buffers may be utilized at different frame rates and thus be displayed substantially simultaneously on the same display. This would occur, for example, when two digital videos with different frame rates were being played on the same display, in different windows.

One problem with zooming user interfaces (ZUI) is that the visual content has to be displayed at different resolutions as the user zooms. The ideal solution to this problem would be to display, in every consecutive frame, an exact and newly computed image based on the underlying visual content. The problem with such an approach is that the exact recalculation of each resolution of the visual content in real time as the user zooms is computationally impractical if the underlying visual content is complex.

As a result of the foregoing, many prior art ZUI systems use a plurality of precomputed images, each being a representation of the same visual content but at different resolutions. We term each of those different precomputed images a Level of Detail (LOD). The complete set of LODs, organized conceptually as a stack of images of decreasing resolution, is termed the LOD pyramid—see FIG. 1. In such prior systems, as zooming occurs, the system interpolates between the LODs and displays a resulting image at a desired resolution. While this approach solves the computational issue, it displays a final compromised image that is often blurred and unrealistic, and often involves loss of information due to the fact that it represents interpolation of different LODs. These interpolation errors are especially noticeable when the user stops zooming and has the opportunity to view a still image at a chosen resolution which does not precisely match the resolution of any of the LODs.

Another problem with interpolating between precomputed LODs is that this approach typically treats vector data in the same way as photographic or image data. Vector data, such as blueprints or line drawings, are displayed by processing a set of abstract instructions using a rendering algorithm, which can render lines, curves and other primitive shapes at any desired resolution. Text rendered using scalable fonts is an important special case of vector data. Image or photographic data (including text rendered using bitmapped fonts) are not so generated, but must be displayed either by interpolation between precomputed LODs or by resampling an original image. We refer to the latter herein as nonvector data.

Prior art systems that use rendering algorithms to redisplay vector data at a new resolution for each frame during a zoom sequence must restrict themselves to simple vector drawings only in order to achieve interactive frame rates. On the other hand, prior art systems that precompute LODs for vector data and interpolate between them, as for nonvector data, suffer from markedly degraded visual quality, as the sharp edges inherent in most vector data renditions are particularly sensitive to interpolation error. This degradation is usually unacceptable for textual content, which is a special case of vector data.

It is an object of the invention to create a ZUI that replicates the zooming effect a user would see if he or she actually had viewed a physical object and moved it closer to himself or herself.

It is an object of the invention to create a ZUI that displays images at an appropriate resolution but which avoids or diminishes the interpolation errors in the final displayed image. A further object of the present invention is to allow the user to zoom arbitrarily far in on vector content while maintaining a crisp, unblurred view of the content and maintaining interactive frame rates.

A further object of the present invention is to allow the user to zoom arbitrarily far out to get an overview of complex vectorial content, while both preserving the overall appearance of the content and maintaining interactive frame rates.

A further object of the present invention is to diminish the user's perception of transitions between LODs or rendition qualities during interaction.

A further object of the present invention is to allow the graceful degradation of image quality by blurring when information ordinarily needed to render portions of the image is as yet incomplete.

A further object of the present invention is to gradually increase image quality by bringing it into sharper focus as more complete information needed to render portions of the image becomes available.

It is an object of the invention to optimally and independently render both vector and nonvector data.

These and other objects of the present invention will become apparent to those skilled in the art from a review of the specification that follows.

SUMMARY OF THE INVENTION

The above and other problems of the prior art are overcome in accordance with the present invention, which relates to a hybrid strategy for implementing a ZUI allowing an image to be displayed at a dynamically varying resolution as a user zooms in or out, rotates, pans, or otherwise changes his or her view of an image. Any such change in view is termed navigation. Zooming of the image to a resolution not equal to that of any of the predefined LODs is accomplished by displaying the image at a new resolution that is interpolated from predefined LODs that "surround" the desired resolution. By "surrounding LODs" we mean the LOD of lowest resolution which is greater than the desired resolution and the LOD of highest resolution which is less than the desired resolution. If the desired resolution is either greater than the resolution of the LOD with the highest available resolution or less than the resolution of the LOD with the lowest resolution, then there will be only a single "surrounding LOD". The dynamic interpolation of an image at a desired resolution based on a set of precomputed LODs is termed in the literature mipmapping or trilinear interpolation. The latter term further indicates that bilinear sampling is used to resample the surrounding LODs, followed by linear interpolation between these resampled LODs (hence trilinear). See, e.g.; Lance Williams. "*Pyramidal Parametrics*," Computer Graphics (Proc. SIGGRAPH '83) 17(3): 1–11 (1983). The foregoing document is incorporated herein by reference in its entirety. Obvious modifications of or extensions to the mipmapping technique introduced by Williams use nonlinear resampling and/or interpolation of the surrounding LODs. In the present invention it is immaterial whether the resampling and interpolation operations are zeroth-order (nearest-neighbor), linear, higher-order, or more generally nonlinear.

In accordance with the invention described herein, when the user defines an exact desired resolution, which is almost never the resolution of one of the predefined LODs, the final image is then displayed by preferably first displaying an intermediate final image. The intermediate final image is the first image displayed at the desired resolution before that image is refined as described hereafter. The intermediate final image may correspond to the image that would be displayed at the desired resolution using the prior art.

In a preferred embodiment, the transition from the intermediate final image to the final image may be gradual, as explained in more detail below.

In an enhanced embodiment, the present invention allows LODs to be spaced in any resolution increments, including irrational increments (i.e. magnification or minification factors between consecutive LODs which cannot be expressed as the ratio of two integers), as explained in more detail below.

In another enhanced embodiment, portions of the image at each different LOD are denoted tiles, and such tiles are rendered in an order that minimizes any perceived imperfections to a viewer. In other embodiments, the displayed visual content is made up of plural LODs (potentially a superset of the surrounding LODs as described above), each of which is displayed in the proper proportion and location in order to cause the display to gradually fade into the final image in a manner that conceals imperfections.

The rendition of various tiles in plural LODs is accomplished in an order that optimizes the appearance of the visual content while staying within acceptable levels of computational complexity so that the system can run on standard computers with typical clock speeds available in most laptop and desktop personal computers.

The present invention involves a hybrid strategy, in which an image is displayed using predefined LODs during rapid zooming and panning, but when the view stabilizes sufficiently, an exact LOD is rendered and displayed. The exact LOD is rendered and displayed at the precise resolution chosen by the user, which is normally different from the predefined LODs. Because the human visual system is insensitive to fine detail in the visual content while it is still in motion, this hybrid strategy can produce the illusion of continuous "perfect rendering" with far less computation.

BRIEF DESCRIPTION OF THE DRAWINGS

FIG. 8 depicts successive stages of the rendering, in foveated order, of the second layer of the LOD pyramid of FIG. 4, the successive stages being illustrated in FIGS. 8A, 8B, 8C, and 8D, respectively, in accordance with one or more embodiments of the present invention.

DETAILED DESCRIPTION OF THE PREFERRED EMBODIMENT

Figure 1:
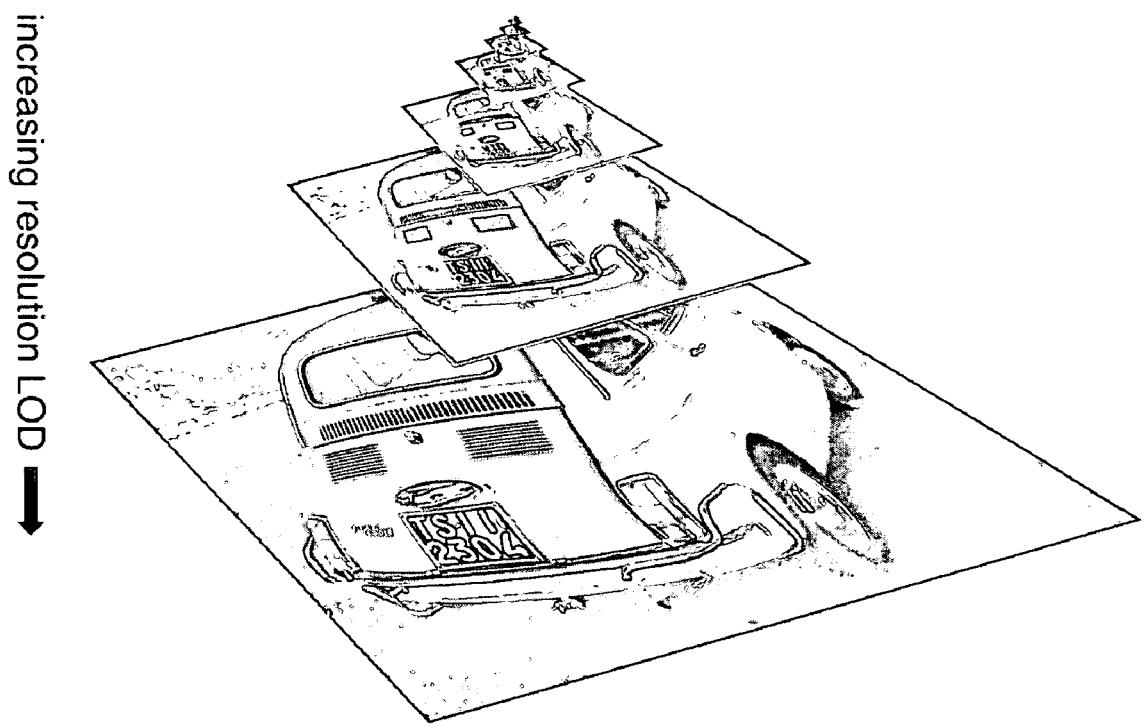
FIG. 1 depicts an LOD pyramid (in this case the base of the pyramid, representing the highest-resolution representation, is a 512×512 sample image, and successive minifications of this image are shown in factors of 2)
Figure 2:
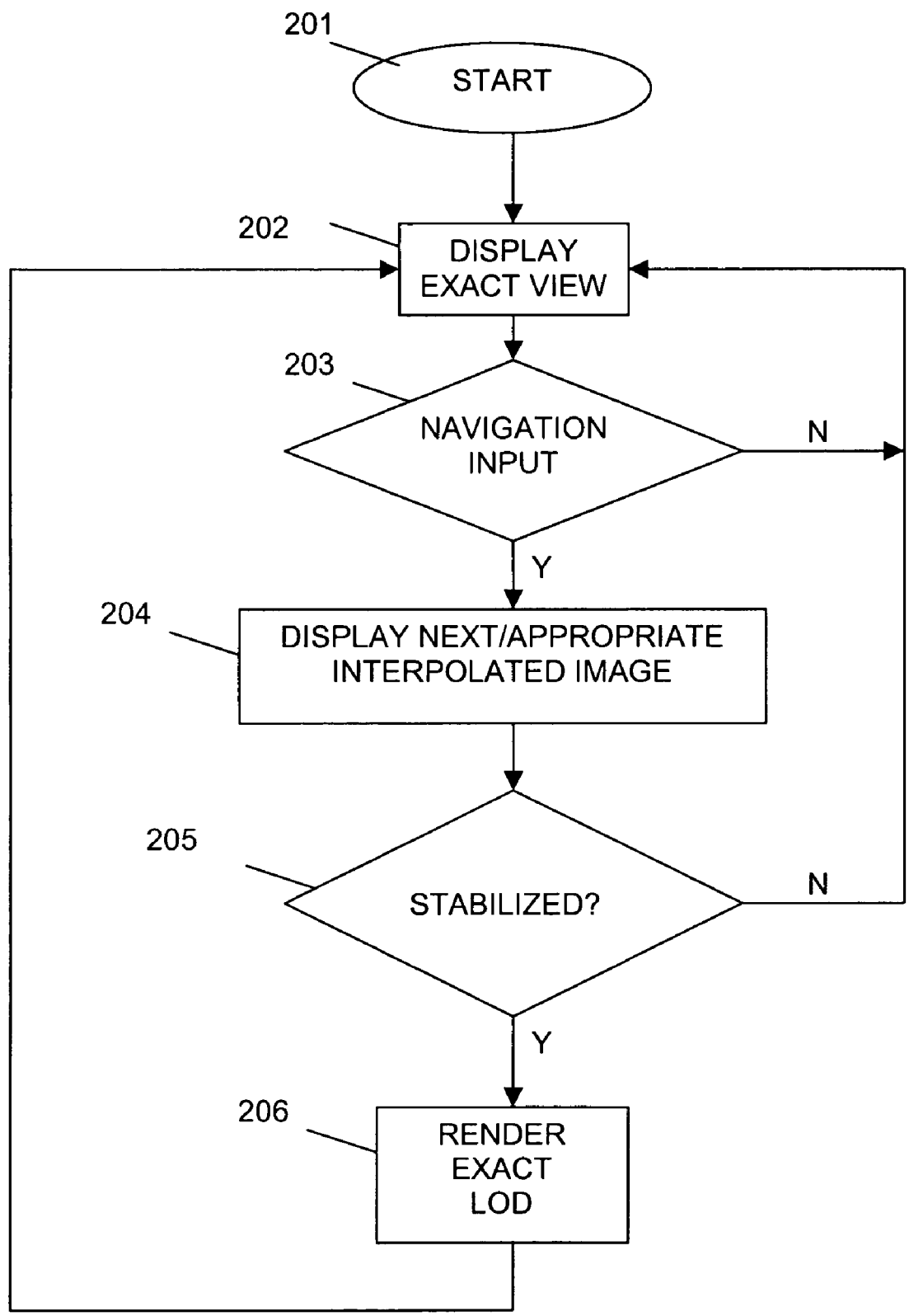
FIG. 2 depicts a flow chart for use in an exemplary embodiment of the invention.

FIG. 2 shows a flowchart of a basic technique for implementation of the present invention. The flowchart of FIG. 2 represents an exemplary embodiment of the invention and would begin executing when an image is displayed at an initial resolution. It is noted that the invention may be used in the client/server model, but that the client and server may be on the same or different machines. Thus, for example, there could be a set of discrete LODs stored remotely at a host computer, and the user can be connected to said host through a local PC. The actual hardware platform and system utilized are not critical to the present invention.

The flowchart is entered at start block 201 with an initial view of an image at a particular resolution. In this example, the image is taken to be static. The image is displayed at block 202. A user may navigate that image by moving, for example, a computer mouse. The initial view displayed at block 202 will change when the user navigates the image. It is noted that the underlying image may itself be dynamic, such as in the case of motion video, however, for purposes of this example, the image itself is treated as static. As explained above, any image to be displayed may also have textual or other vector data and/or nonvector data such as photographs and other images. The present invention, and the entire discussion below, is applicable regardless of whether the image comprises vector or nonvector data, or both.

Regardless of the type of visual content displayed in block 202, the method transfers control to decision point 203 at which navigation input may be detected. If such input is not detected, the method loops back to block 202 and continues displaying the stationary visual content. If a navigation input is detected, control will be transferred to block 204 as shown.

Decision point 203 may be implemented by a continuous loop in software looking for a particular signal that detects movement, an interrupt system in hardware, or any other desired methodology. The particular technique utilized to detect and analyze the navigation request is not critical to the present invention. Regardless of the methodology used, the system can detect the request, thus indicating a desire to navigate the image. Although much of the discussion herein relates to zooming, it is noted that the techniques are applicable to zooming, panning, or otherwise navigating. Indeed, the techniques described herein are applicable to any type of dynamic transformation or change in perspective on the image. Such transformations may include, for example, three dimensional translation and rotation, application of an image filter, local stretching, dynamic spatial distortion applied to selected areas of the image, or any other kind of distortion that might reveal more information. Another example would be a virtual magnifying glass, that can get moved over the image and which magnifies parts of the image under the virtual magnifying glass. When decision point 203 detects that a user is initiating navigation, block 204 will then render and display a new view of the image, which may be, for example, at a different resolution from the prior displayed view.

One straightforward prior art technique of displaying the new view is based upon interpolating LODs as the user zooms in or out. The selected LODs may be those two LODs that "surround" the desired resolution; i.e.; the resolution of the new view. The interpolation, in prior systems, constantly occurs as the user zooms and is thus often implemented directly in the hardware to achieve speed. The combination of detection of movement in decision point 205 and a substantially immediate display of an appropriate interpolated image at block 204 results in the image appearing to zoom continuously as the user navigates. During zooming in or out, since the image is moving, an interpolated image is sufficient to look realistic and clear. Any interpolation error is only minimally detectable by the human visual system, as such errors are disguised by the constantly changing view of the image.

At decision point 205, the system tests whether or not the movement has substantially ceased. This can be accomplished using a variety of techniques, including, for example, measuring the rate of change of one or more parameters of the view. That is, the methodology ascertains whether or not the user has arrived at the point where he has finished zooming. Upon such stabilization at decision point 205, control is transferred to block 206, where an exact image is rendered, after which control returns to block 203. Thus, at any desired resolution, the system will eventually display an exact LOD.

Notably, the display is not simply rendered and displayed by an interpolation of two predefined LODs, but may be rendered and displayed by re-rendering vector data using the original algorithm used to render the text or other vector data when the initial view was displayed at block 202. Nonvector data may also be resampled for rendering and displayed at the exact required LOD. The required re-rendering or resampling may be performed not only at the precise resolution required for display at the desired resolution, but also on a sampling grid corresponding precisely to the correct positions of the display pixels relative to the underlying content, as calculated based on the desired view. As an example, translation of the image on the display by ½ pixel in the display plane does not change the required resolution, but it does alter the sampling grid, and therefore requires re-rendering or resampling of the exact LOD.

The foregoing system of FIG. 2 represents a hybrid approach in which interpolation based upon predefined LODs is utilized while the view is changing (e.g. navigation is occurring) but an exact view is rendered and displayed when the view becomes substantially stationary.

For purposes of explanation herein, the term render refers to the generation by the computer of a tile at a specific LOD based upon vector or nonvector data. With respect to non-vector data, these may be rerendered at an arbitrary resolution by resampling an original image at higher or lower resolution.

Figure 3:
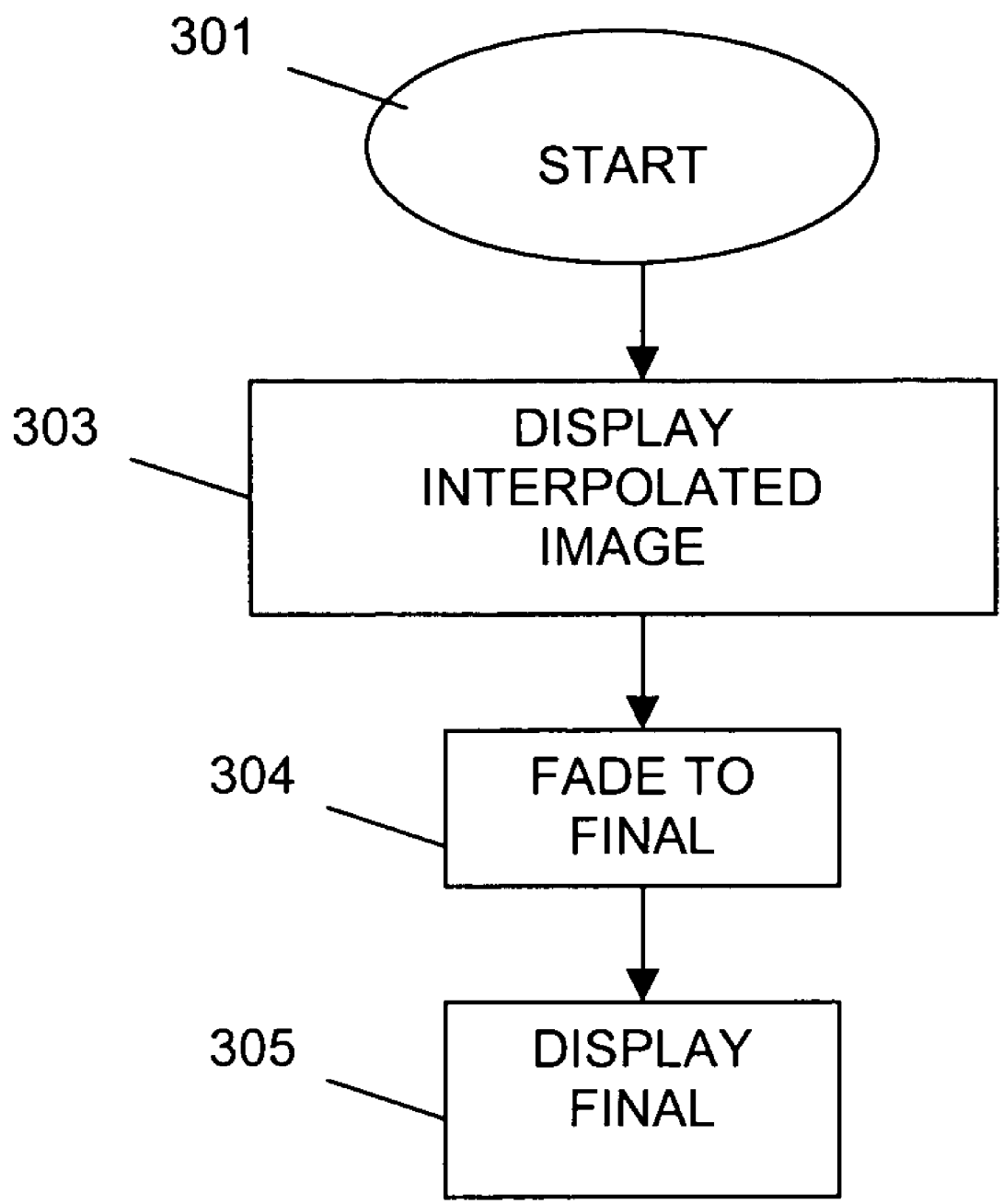
FIG. 3 is another flow chart that shows how the system displays the final image after zooming.

We turn now to the methodology of rendering and displaying the different portions of the visual content needed to achieve an exact final image as represented by block 206 of FIG. 2. With reference to FIG. 3, when it is determined that navigation has ceased, control is transferred to block 303 and an interpolated image is immediately displayed, just as is the case during zooming. We call this interpolated image that may be temporarily displayed after the navigation ceases the intermediate final image, or simply an intermediate image. This image is generated from an interpolation of the surrounding LODs. In some cases, as explained in more detail below, the intermediate image may be interpolated from more than two discrete LODs, or from two discrete LODs other than the ones that surround the desired resolution.

Once the intermediate image is displayed, block 304 is entered, which causes the image to begin to gradually fade towards an exact rendition of the image, which we term the final image. The final image differs from the intermediate image in that the final image may not involve interpolation of any predefined LODs. Instead, the final image, or portions thereof, may comprise newly rendered tiles. In the case of photographic data, the newly rendered tiles may result from resampling the original data, and in the case of vector data, the newly rendered tiles may result from rasterization at the desired resolution.

It is also noted that it is possible to skip directly from block 303 to 305, immediately replacing the interpolated image with a final and exact image. However, in the preferred embodiment, step 304 is executed so the changeover from the intermediate final image to the final image is done gradually and smoothly. This gradual fading, sometimes called blending, causes the image to come into focus gradually when navigation ceases, producing an effect similar to automatic focusing in cameras or other optical instruments. The illusion of physicality created by this effect is an important aspect of the present invention.

Following is a discussion of the manner in which this fading or blending may take place in order to minimize perceived irregularities, sudden changes, seams, and other imperfections in the image. It is understood however that the particular technique of fading is not critical to the present invention, and that many variations will be apparent to those of skill in the art.

Different LODs differ in the number of samples per physical area of the underlying visual content. Thus, a first LOD may take a 1 inch by 1 inch area of a viewable object and generate a single 32 by 32 sample tile. However, the information may also be rendered by taking the same 1 inch by 1 inch area and representing it as a tile that is 64 by 64 samples, and therefore at a higher resolution.

Figure 4:
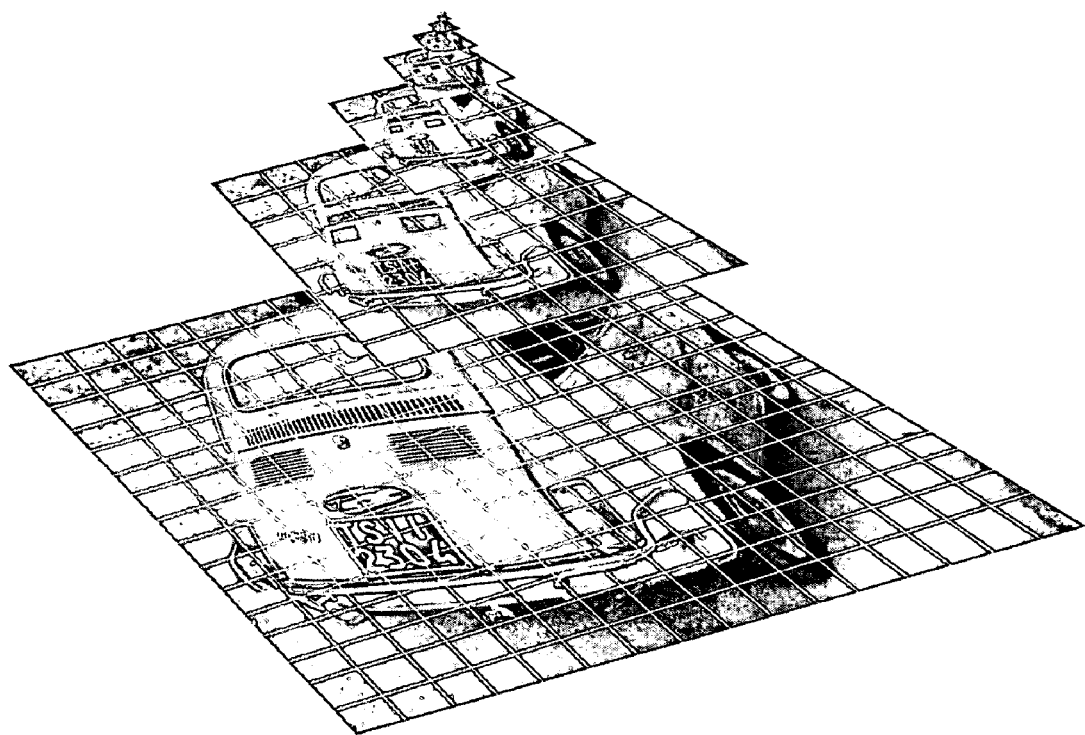
FIG. 4 is the LOD pyramid of FIG. 1 with grid lines added showing the subdivision of each LOD into rectangular tiles of equal size in samples.

We define a concept called irrational tiling. Tiling granularity, which we will write as the variable g, is defined as the ratio of the linear tiling grid size at a higher-resolution LOD to the linear tiling grid size at the next lower-resolution LOD. In the Williams paper introducing trilinear interpolation, g=2. This same value of g has been used in other prior art. Although LODs may be subdivided into tiles in any fashion, in an exemplary embodiment each LOD is subdivided into a grid of square or rectangular tiles containing a constant number of samples (except, as required, at the edges of the visual content). Conceptually, when g=2, each tile at a certain LOD "breaks up" into 2×2=4 tiles at the next higher-resolution LOD (again, except potentially at the edges), as shown in FIG. 4.

There are fundamental shortcomings in tilings of granularity 2. Usually, if a user zooms in on a random point in a tile, every g-fold increase in zoom will require the rendition of a single additional tile corresponding to the next higher-resolution LOD near the point toward which the user is zooming. However, if a user is zooming in on a grid line in the tiling grid, then two new tiles need to be rendered, one on either side of the line. Finally, if a user is zooming in on the intersection of two grid lines, then four new tiles need to be rendered. If these events—requests for 1, 2 or 4 new tiles with each g-fold zoom—are interspersed randomly throughout an extended zooming sequence, then overall performance will be consistent. However, a grid line in any integral-granularity tiling (i.e. where g is a whole number) remains a grid line for every higher-resolution LOD.

Consider, for example, zooming in on the center of a very large image tiled with granularity 2. We will write the (x,y) coordinates of this point as (½,½), adopting the convention that the visual content falls within a square with corners (0,0), (0,1), (1,0) and (1,1). Because the center is at the intersection of two grid lines, as the user reaches each higher-resolution LOD, four new tiles need to be rendered every time; this will result in slow performance and inefficiency for zooming on this particular point. Suppose, on the other hand, that the user zooms in on an irrational point—meaning a grid point (x,y) such that x and y cannot be expressed as the ratios of two whole numbers. Examples of such numbers are pi (=3.14159 . . . ) and the square root of 2 (=1.414213 . . . ). Then, it can easily be demonstrated that the sequence of 1's, 2's and 4's given by the number of tiles that need to be rendered for every g-fold zoom is quasi-random, i.e. follows no periodic pattern. This kind of quasi-random sequence is clearly more desirable from the point of view of performance; then there are no distinguished points for zooming from a performance standpoint.

Irrational tiling resolves this issue: g itself is taken to be an irrational number, typically the square root of 3, 5 or 12. Although this means that on average 3, 5 or 12 tiles (correspondingly) at a given LOD are contained within a single tile at the next lower-resolution LOD, note that the tiling grids at consecutive LODs no longer "agree" on any grid lines in this scheme (except potentially at the leading edges of the visual content, x=0 and y=0, or at some other preselected single grid line along each axis). If g is chosen such that it is not the $n^{th}$ root of any integer (pi is such a number), then no LODs will share any grid lines (again, potentially except x=0 and y=0). Hence it can be shown that each tile may randomly overlap 1, 2, or 4 tiles at the next lower LOD, whereas with g=2 this number is always 1.

With irrational tiling granularity, zooming in on any point will therefore produce a quasi-random stream of requests for 1, 2 or 4 tiles, and performance will be on average uniform when zooming in everywhere. Perhaps the greatest benefit of irrational tiling emerges in connection with panning after a deep zoom. When the user pans the image after having zoomed in deeply, at some point a grid line will be moved onto the display. It will usually be the case that the region on the other side of this grid line will correspond to a lower-resolution LOD than the rest of the display; it is desirable, however, for the difference between these resolutions to be as small as possible. With integral g, however, the difference will often be extremely large, because grid lines can overlap over many consecutive LODs. This creates "deep cracks" in resolution over the node area, as shown in FIG. 6(a).

On the other hand, because grid lines in an irrational tiling never overlap those of an adjacent LOD (again with the possible exception of one grid line in each direction, which may be at one corner of the image), discontinuities in resolution of more than one LOD do not occur. This increased smoothness in relative resolution allows the illusion of spatial continuity to be much more convincing.

Figure 6:
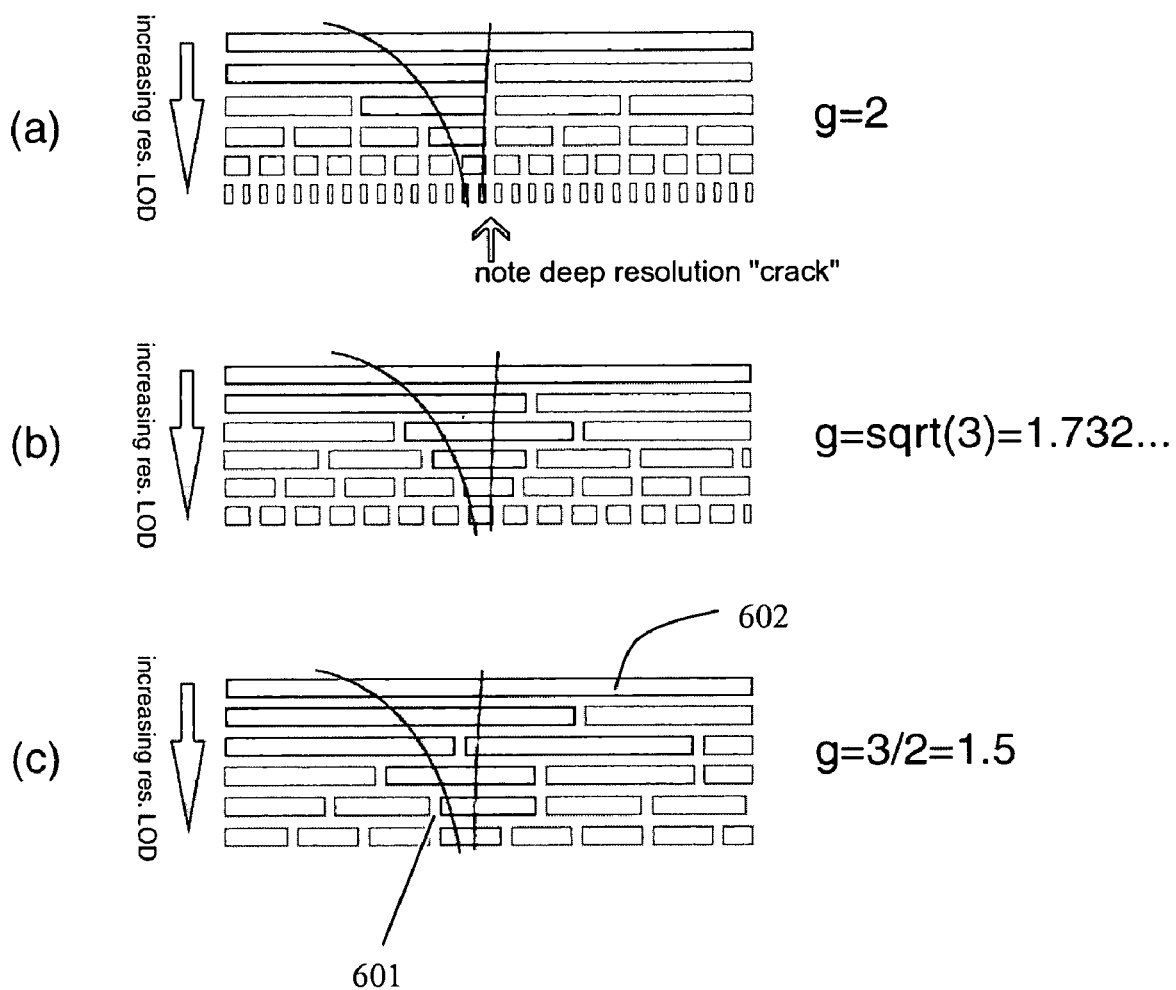
FIG. 6 shows a concept termed irrational tiling, explained in more detail herein.

FIG. 6(b) illustrates the advantage gained by irrational tiling granularity. FIG. 6 shows cross-sections through several LODs of the visual content; each bar represents a cross-section of a rectangular tile. Hence the second level from the top, in which there are two bars, might be a 2×2=4 tile LOD. The curves 601, drawn from top to bottom, represent the bounds of the visible area of the visual content at the relevant LOD during a zooming operation: as the resolution is increased (zooming in to reveal more detail), the area under examination decreases. Darker bars (e.g., 602) represent tiles which have already been rendered over the course of the zoom. Lighter bars have not yet been rendered, so cannot be displayed. Note that when the tiling is integral as in FIG. 6(a), abrupt changes in resolution over space are common; if the user were to pan right after the zoom, then at the spatial boundary indicated by the arrow, four LODs would "end" abruptly. The resulting image would look sharp to the left of this boundary, and extremely blurry to the right. The same visual content represented using an irrational tiling granularity lacks such resolution "cracks": adjacent LODs do not share tile boundaries, except as shown at the left edge. Mathematically, this shared boundary may occur at most in one position on the x-axis and at one position on the y-axis. In the embodiment shown these shared boundaries are positioned at y=0 and x=0, but, if present, they may also be placed at any other position.

Another benefit of irrational tiling granularity is that it allows finer control of g, since there are a great many more irrational numbers than integers, particularly over the useful range where g is not too large. This additional freedom can be useful for tuning the zooming performance of certain applications. If g is set to the irrational square root of an integer (such as sqrt(2), sqrt(5) or sqrt(8)), then in the embodiment described above the grid lines of alternate LODs would align exactly; if g is an irrational cube root, then every third LOD would align exactly; and so on. This confers an additional benefit with respect to limiting the complexity of a composite tiling, as defined below.

An important aspect of the invention is the order in which the tiles are rendered. More particularly, the various tiles of the various LODs are optimally rendered such that all visible tiles are rendered first. Nonvisible tiles may not be rendered at all. Within the set of visible tiles, rendition proceeds in order of increasing resolution, so that tiles within low-resolution LODs are rendered first. Within any particular LOD, tiles are rendered in order of increasing distance from the center of the display, which we refer to as foveated rendering. To sort such tiles in the described order, numerous sorting algorithms such as heapsort, quicksort, or others may be used. To implement this ordering, lexicographic key may be used for sorting "requests" to render tiles, such that the outer subkey is visibility, the middle subkey is resolution in samples per physical unit, and the inner subkey is distance to the center of the display. Other methods for ordering tile rendering requests may also be used. The actual rendering of the tiles optimally takes place as a parallel process with the navigation and display described herein. When rendering and navigation/display proceed as parallel processes, user responsiveness may remain high even when tiles are slow to render.

We now describe the process of rendering a tile in an exemplary embodiment. If a tile represents vector data, such as alphabetic typography in a stroke based font, then rendering of the tile would involve running the algorithm to rasterize the alphabetic data and possibly transmitting that data to a client from a server. Alternatively, the data fed to the rasterization algorithm could be sent to the client, and the client could run the algorithm to rasterize the tile. In another example, rendering of a tile involving digitally sampled photographic data could involve resampling of that data to generate the tile at the appropriate LOD. For discrete LODs that are prestored, rendering may involve no more than simply transmitting the tile to a client computer for subsequent display. For tiles that fall between discrete LODs, such as tiles in the final image, some further calculation as described above may be required.

At any given time, when the tiles are rendered and the image begins to fade toward the exact image, the actual display may comprise different mixes of different tiles from different LODs. Thus, any portion of the display could contain for example, 20% from LOD 1, 40% from LOD 2, and 40% from LOD 3. Regardless of the tiles displayed, the algorithm attempts to render tiles from the various LODs in a priority order best suited to supply the rendered tiles for display as they are most needed. The actual display of the rendered tiles will be explained in more detail later with reference to FIG. 5.

In what follows we describe a method for drawing the plural LODs using an algorithm which can guarantee spatial and temporal continuity of image detail. The algorithm is designed to make the best use of all rendered tiles, using high-resolution tiles in preference to lower-resolution tiles covering the same display area, yet using spatial blending to avoiding sharp boundaries between LODs, and temporally graduated blending weights to blend in higher detail if and when it becomes available (i.e. when higher-resolution tiles have been rendered). Unlike the prior art, this algorithm and variants thereof can result in more than two LODs being blended together at a given point on the display; it can also result in blending coefficients that vary smoothly over the display area; and it can result in blending coefficients that evolve in time even after the user has stopped navigating. In this exemplary embodiment it is nonetheless computationally efficient, and can be used to render imagery as partially transparent, or with an overall transparency that varies over the image area, as will become apparent.

Figure 7:
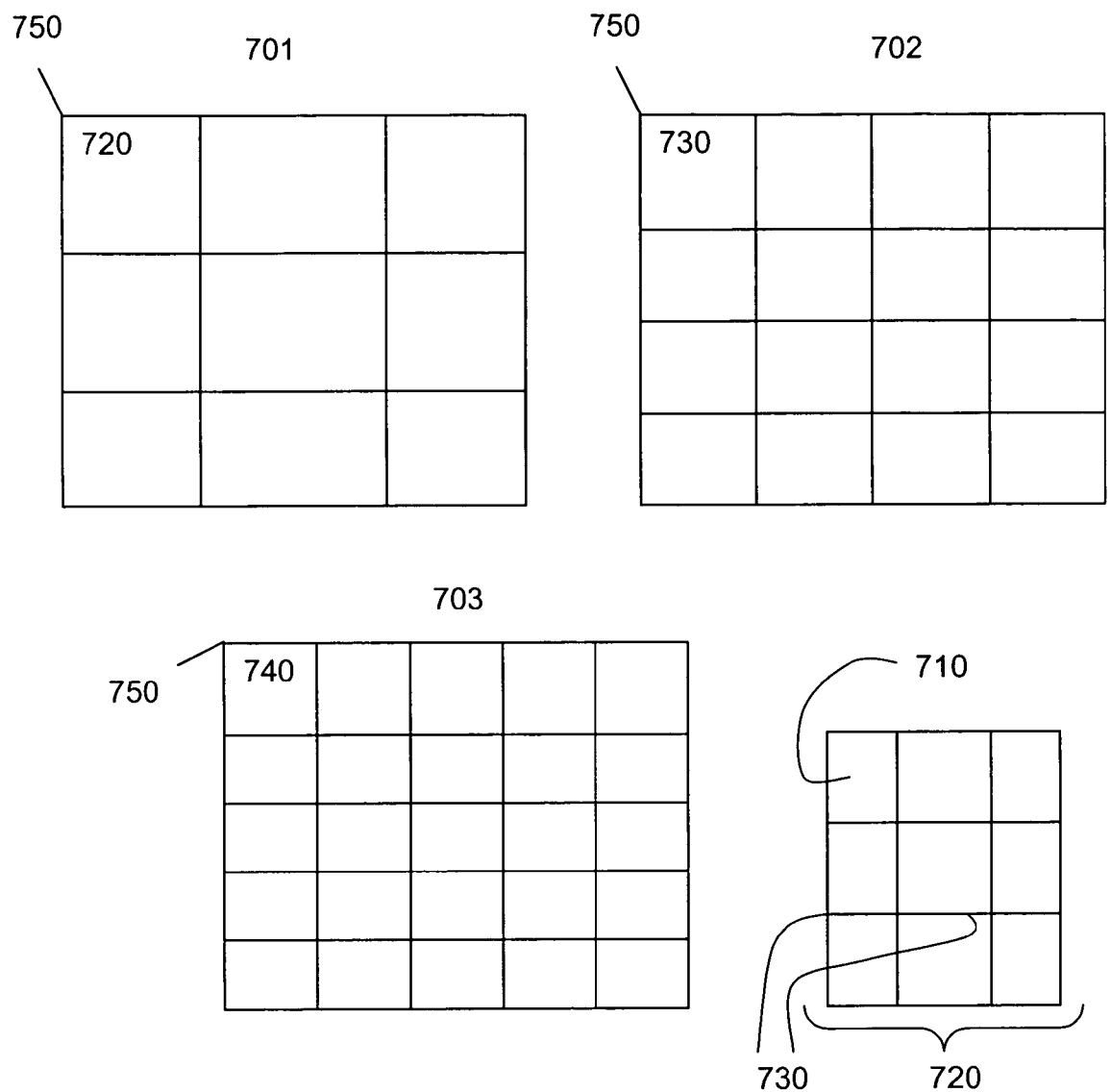
FIG. 7 depicts a composite tile and the tiles that make up the composite tile, as explained more fully below.

We define herein a composite tile area, or simply a composite tile. To define a composite tile we consider all of the LODs stacked on top of each other. Each LOD has its own tile grid. The composite grid is then formed by the projection of all of the grids from all of the LODs onto a single plane. The composite grid is then made up of various composite tiles of different sizes, defined by the boundaries of tiles from all of the different LODs. This is shown conceptually in FIG. 7. FIG. 7 depicts the tiles from three different LODs, 701 through 703, all representing the same image. One can imagine the LODs 701 through 703 being stacked up on top of each other. In such a case, if one lined up corner 750 from each of these LODs and stacked them on top of each other, an area represented by 740 would be inside the area represented by 730, and the areas represented by 730 and 740, would be inside the area represented by 720. Area 710 of FIG. 7 shows that there would be a single "composite tile" 710. Each of the composite tiles is examined during each frame, wherein the frame rate may be typically greater than ten frames per second. Note that, as explained above, this frame rate is not necessarily the display refresh rate.

Figure 5:
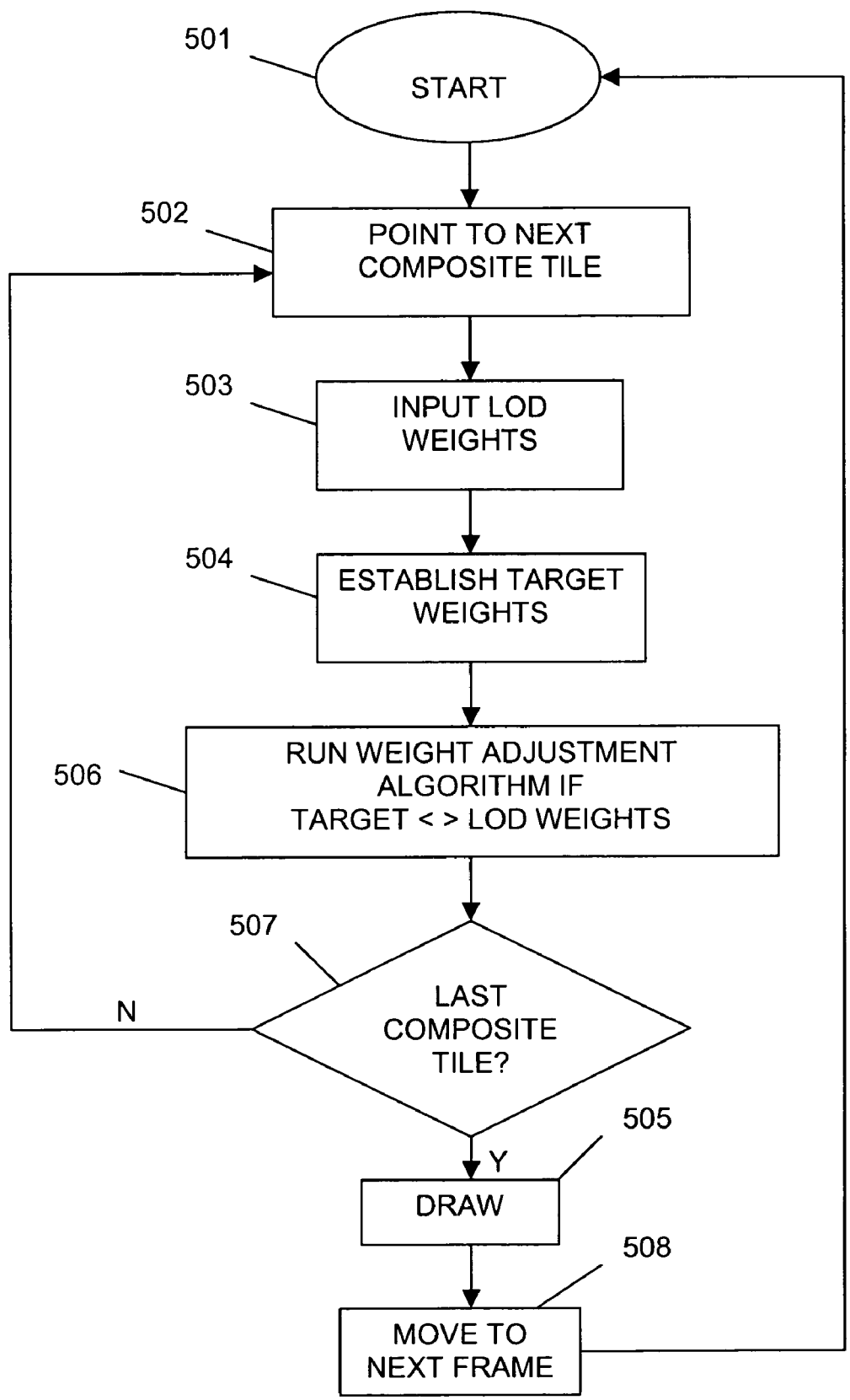
FIG. 5 is another flow chart, for use in connection with the present invention, and it depicts a process for displaying rendered tiles on a display.

FIG. 5 depicts a flow chart of an algorithm for updating the frame buffer as tiles are rendered. The arrangement of FIG. 5 is intended to operate on every composite tile in the displayed image each time the frame buffer is updated. Thus, for example, if a frame duration is $\frac{1}{20}$ of a second, each of the composite tiles on the entire screen would preferably be examined and updated during each $\frac{1}{20}$ of a second. When a composite tile is operated upon by the process of FIG. 5, the composite tile may lack the relevant tiles in one or more LODs. The process of FIG. 5 attempts to display each composite tile as a weighted average of all the available superimposed tiles within which the composite tile lies. Note that composite tiles are defined in such a way that they fall within exactly one tile at any given LOD; hence the weighted average can be expressed as a relative proportion of each LOD. The process attempts to determine the appropriate weights for each LOD within the composite tile, and to vary those weights gradually over space and time to cause the image to gradually fade towards the final image discussed above.

The composite grid includes plural vertices which are defined to be any intersection or corner of gridlines in the composite grid. These are termed composite grid vertices. We define an opacity for each LOD at each composite grid vertex. The opacity can be expressed as a weight between 0.0 and 1.0, and the sum of all the LOD weights at each vertex should therefore be 1.0 if the desired result is for the image to be totally opaque. The current weights at any particular time for each LOD at each vertex are maintained in memory.

The algorithm for updating vertex weights proceeds as described below.

The following variables, which are taken to be numbers between 0.0 and 1.0, are kept in memory for each tile: centerOpacity, cornerOpacity for each corner (4 if the tiling is a rectangular grid), and edgeOpacity for each edge (4 if the tiling is a rectangular grid). When a tile is first rendered, all of its opacities as just listed are normally set to 1.0.

During a drawing pass, the algorithm walks through the composite tiling once for each relevant LOD, beginning with the highest-resolution LOD. In addition to the per-tile variables, the algorithm maintains the following variables: levelOpacityGrid and opacityGrid. Both of these variables are again numbers between 0.0 and 1.0, and are maintained for each vertex in the composite tiling.

The algorithm walks through each LOD in turn, in order from highest-resolution to lowest, performing the following operations. First 0.0 is assigned to levelOpacityGrid at all vertices. Then, for each rendered tile at that LOD (which may be a subset of the set of tiles at that LOD, if some have not yet been rendered), the algorithm updates the parts of the levelOpacityGrid touching that tile based on the tile's centerOpacity, cornerOpacity and edgeOpacity values:

If the vertex is entirely in the interior of the tile, then it gets updated using centerOpacity.

If the vertex is e.g. on the tile's left edge, it gets updated with the left edgeOpacity.

If the vertex is e.g. on the top right corner, it gets updated with the top right cornerOpacity.

"Updating" means the following: if the pre-existing levelOpacityGrid value is greater than 0.0, then set the new value to the minimum of the present value, or the value it's being updated with. If the pre-existing value is zero (i.e. this vertex hasn't been touched yet) then just set the levelOpacityGrid value to the value it's being updated with. The end result is that the levelOpacityGrid at each vertex position gets set to the minimum nonzero value with which it gets updated.

The algorithm then walks through the levelOpacityGrid and sets to 0.0 any vertices that touch a tile which has not yet been rendered, termed a hole. This ensures spatial continuity of blending: wherever a composite tile falls within a hole, at the current LOD, drawing opacity should fade to zero at all vertices abutting that hole.

In an enhanced embodiment, the algorithm can then relax all levelOpacityGrid values to further improve spatial continuity of LOD blending. The situation as described thus far can be visualized as follows: every vertex is like a tentpole, where the levelOpacityGrid value at that point are the tentpole's height. The algorithm has thus far ensured that at all points bordering on a hole, the tentpoles have zero height; and in the interior of tiles that have been rendered, the tentpoles are set to some (probably) nonzero value. In the extreme case, perhaps all the values inside a rendered tile are set to 1.0. Assume for purposes of illustration that the rendered tile has no rendered neighbors yet, so the border values are 0.0. We have not specified how narrow the "margin" is between a 0.0 border tentpole and one of the 1.0 internal tentpoles. If this margin is too small, then even though the blending is technically continuous, the transition may be too sharp when measured as an opacity derivative over space. The relax operation smoothes out the tent, always preserving values of 0.0, but possibly lowering other tentpoles to make the function defined by the tent surface smoother, i.e. limiting its maximum spatial derivative. It is immaterial to the invention which of a variety of methods are used to implement this operation; one approach, for example, is to use selective low-pass filtering, locally replacing every nonzero value with a weighted average of its neighbors while leaving zeroes intact. Other methods will also be apparent to those skilled in the art.

The algorithm then walks over all composite grid vertices, considering corresponding values of levelOpacityGrid and opacityGrid at each vertex: if levelOpacityGrid is greater than 1.0-opacityGrid, then levelOpacityGrid is set to 1.0-opacityGrid. Then, again for each vertex, corresponding values of levelOpacityGrid are added to opacityGrid. Due to the previous step, this can never bring opacityGrid above 1.0. These steps in the algorithm ensure that as much opacity as possible is contributed by higher-resolution LODs when they are available, allowing lower-resolution LODs to "show through" only where there are holes.

The final step in the traversal of the current LOD is to actually draw the composite tiles at the current LOD, using levelOpacityGrid as the per-vertex opacity values. In an enhanced embodiment, levelOpacityGrid can be multiplied by a scalar overallOpacity variable in the range 0.0 to 1.0 just before drawing; this allows the entire image to be drawn with partial transparency given by the overallOpacity. Note that drawing an image-containing polygon, such as a rectangle, with different opacities at each vertex is a standard procedure. It can be accomplished, for example, using industry-standard texture mapping functions using the OpenGL or Direct3D graphics libraries. In practice, the drawn opacity within the interior of each such polygon is spatially interpolated, resulting in a smooth change in opacity over the polygon.

In another enhanced embodiment of the algorithm described above, tiles maintain not only their current values of centerOpacity, cornerOpacity and edgeOpacity (called the current values), but also a parallel set of values called targetCenterOpacity, targetCornerOpacity and targetEdgeOpacity (called the target values). In this enhanced embodiment, the current values are all set to 0.0 when a tile is first rendered, but the target values are all set to 1.0. Then, after each frame, the current values are adjusted to new values closer to the target values. This may be implemented using a number of mathematical formulae, but as an example, it can be done in the following way: newValue=oldValue*(1−b)+targetValue*b, where b is a rate in greater than 0.0 and less than 1.0. A value of b close to 0.0 will result in a very slow transition toward the target value, and a value of b close to 1.0 will result in a very rapid transition toward the target value. This method of updating opacities results in exponential convergence toward the target, and results in a visually pleasing impression of temporal continuity. Other formulae can achieve the same result.

FIG. 8 depicts successive stages of the rendering, in foveated order, of the second layer of the LOD pyramid of FIG. 8, in accordance with one or more embodiments of the present invention.

The foregoing describes the preferred embodiment of the present invention. The invention is not limited to such preferred embodiment, and various modifications consistent with the appended claims are included within the invention as well.

The invention claimed is:

1. A method of displaying visual content, said method comprising:
   generating a plurality of different levels of detail (LODs) of the visual content;
   displaying the visual content as an interpolation of said LODs while the visual content is navigated; and displaying a final image including at least a portion not as an interpolation of said LODs when said navigation substantially ceases, wherein prior to said final image being displayed, an intermediate final image is generated by interpolation from said plurality of said LODs, wherein each LOD is comprised of tiles and said final image or said intermediate final image is displayed by using tiles from several LODs displayed as composite tiles, wherein the tiles of each LOD are made available for entry into a frame buffer in an order that depends at least in part upon the LOD in which the tile is, or whether the tile is viewable presently, or the degree of foveation of such tile, and wherein viewable tiles are rendered first, and within said viewable tiles, tiles are rendered in order of increasing resolution, and within tiles of a similar resolution, tiles are rendered in foveated order, the method further comprising implementing irrational tiling.

2. The method of claim 1 wherein said intermediate final image gradually changes to said final image.

3. The method of claim 1 wherein said final image or said intermediate image is rendered on a tile-by-tile basis.

4. A method of displaying visual content comprising combining plural LODs representing visual content, and gradually altering a contribution attributable to at least one of said LODs so that said displayed visual content gradually changes toward a better displayed image in response to information to render said better displayed image becoming available, wherein said assigning assigns plural weights to each of said tiles in at least one LOD, and wherein said plural weights include opacities at each of plural corners of said tile, opacities at each of plural edges of said tile, and an opacity at a point within each of said tiles.

5. The method of claim 4 further comprising calculating a levelopacitygrid set of variables for plural locations in an LOD, said levelopacitygrid set of variables being calculated by utilizing at least some of said weights for all tiles in said LOD tangent to a vertex at which said levelopacitygrid is to be calculated.

6. The method of claim 5 further comprising spatially filtering said levelopacitygrid set of variables for at least one LOD.

7. A method of combining plural LODs to display visual content, the method comprising weighting each of the LODs with an associated contribution, and varying the contribution provided by each LOD over time and space, wherein the weighting is an opacity level, wherein the total opacity of the combined LODs is less than one hundred percent, and wherein said varying over time results in exponential convergence toward a target value.

8. The method of claim 7 wherein for each LOD, an opacity level is calculated for each of a plurality of vertices.

9. The method of claim 8 wherein said varying over time and space is designed to diminish viewable discontinuities.

10. The method of claim 9 wherein values representing the weighting are low pass filtered.

11. A method of displaying visual content comprising combining plural LODs representing visual content, and gradually altering a contribution attributable to at least three of said LODs so that said displayed visual content gradually changes, wherein said contribution is altered gradually by assigning at least one weight to plural tiles within plural LODs, and then altering said weights, wherein said assigning assigns plural weights to each of said tiles in at least one LOD, and wherein said plural weights include opacities at each of plural corners of said tile, opacities at each of plural edges of said tile, and an opacity at a point within each of said tiles.

12. The method of claim 11 further comprising calculating a levelopacitygrid set of variables for plural locations in an LOD, said levelopacitygrid set of variables being calculated by utilizing at least some of said weights for all tiles in said LOD tangent to a vertex at which said levelopacitygrid is to be calculated.

13. The method of claim 12 further comprising spatially filtering said levelopacitygrid set of variables for at least one LOD.

* * * * *